United States Patent [19]
Gyenes

[11] Patent Number: 5,196,280
[45] Date of Patent: Mar. 23, 1993

[54] ADHESIVE PAD WITH A SHRINKABLE LAYER

[75] Inventor: Russell E. Gyenes, Sunrise, Fla.
[73] Assignee: Motorola, Inc., Schaumburg, Ill.
[21] Appl. No.: 726,498
[22] Filed: Jul. 8, 1991
[51] Int. Cl.$^5$ .............................................. H01M 2/10
[52] U.S. Cl. .................................. 429/144; 429/186; 428/346; 428/352
[58] Field of Search ............... 429/142, 144, 145, 157, 429/186, 167; 428/352, 354, 346, 347

[56] References Cited

U.S. PATENT DOCUMENTS

| | | | |
|---|---|---|---|
| 4,469,742 | 9/1984 | Oberle et al. | 428/347 X |
| 4,545,639 | 10/1985 | Holden | 339/256 R |
| 4,554,226 | 11/1985 | Simonton | 429/153 |
| 4,596,732 | 6/1986 | Diaz | 428/347 X |
| 4,844,973 | 7/1989 | Konishi et al. | 428/354 X |
| 4,911,994 | 3/1990 | Will et al. | 429/167 |
| 4,993,974 | 2/1991 | Selinko | 439/627 |

FOREIGN PATENT DOCUMENTS

| | | | |
|---|---|---|---|
| 2548813 | 5/1977 | Fed. Rep. of Germany | 429/186 |
| 2756320 | 6/1979 | Fed. Rep. of Germany | 429/186 |

*Primary Examiner*—Stephen Kalafut
*Attorney, Agent, or Firm*—Robert S. Babayi

[57] ABSTRACT

An adhesive pad (100) is provided which has a shrinkable member (130) disposed on an adhesive member, including a film (110), and an adhesive layer (120). The shrinkable member (130) is responsive to heat to expose a portion of an adhesive surface (126) in response to heat.

28 Claims, 3 Drawing Sheets

ADHESIVE PAD WITH A SHRINKABLE LAYER

TECHNICAL FIELD

This invention relates generally to adhesive pads and in particular to adhesive pads which bond to a device to prevent its movements within a housing assembly.

BACKGROUND

Portable electronic devices, such as radios, typically use an energy source in the form of a battery to derive power necessary for their operation. The battery can comprise a single battery cell or a plurality of battery cells arranged in a suitable fashion to provide a desired supply voltage. A contacting scheme is required to reliably connect the energy source with the external electronic device during all modes of operation.

An example of a more demanding mode is when the electronic device, such as a radio, has been dropped. Any movement of the battery during the shock and vibration created by the impact of the drop could cause a loss of power to the device due to breakage of battery connections. The loss of power to the device may have undesirable or even unpredictable effects on device operation. For example, in the case of a device which uses a volatile memory circuit, loss of power could amount to a total loss of memory. An important point which must be considered in the case of portable radios, is that the mass of the battery comprises a significant portion of the total mass of the radio. In this case, retaining the battery in a constant position in all possible orientations and under shocks and vibration becomes very important.

Battery cells are often cylindrically or rectangularly shaped and include positive and negative electrical contact surfaces at their opposed ends. Generally, a number of battery cells are serially coupled to produce a battery pack which is inserted into a cylindrical chamber or a rectangular chamber formed within a battery housing. To contact a battery, present embodiments require that conductive contacts be placed at opposite ends of the chamber so as to contact battery terminals. One of the conventional methods uses a conductive spring contact that compresses against the battery pack when it is positioned in the chamber. The spring force exerted by the spring contact acts to retain the battery against an opposing conductive contact. Alternatively, shock absorbing pads may be positioned at one of the opposing ends of the battery housing to prevent battery movements. However, in order to accommodate the spring contacts of the shock absorbing pad, these approaches increase the height of the battery package.

Another method for reducing battery movements is the application of hot melt after the battery pack is inserted into the battery housing. In this method, melted epoxy is deposited between the battery pack and the housing member to bond them to each other. When the epoxy is cured, the battery is secured to the battery housing. This process, however, is labor intensive and requires an elaborate process control mechanism to ensure adequate hot melt deposition. Excessive deposition may cause cosmetic defects and insufficient deposition may create a weak bond which increases the chance of breakage. Additionally, once the epoxy is cured, the battery pack becomes unsalvagable when the battery housing needs to be replaced.

Another method comprises positioning a pad having double-sided adhesive surfaces between the battery pack and the housing member. The pad effectively prevents movement by neutralizing the sheer forces exerted against the battery pack during shock or vibration by neutralizing the sheer forces exerted against. In this method, one adhesive side is attached to a battery housing wall while the other adhesive side is exposed and later attaches to the battery pack. This approach is desired in assembling battery packages which do not require inserting the battery in a chamber-like housing. However, in a battery housing which includes a chamber or pocket, the exposed adhesive surface makes insertion of the battery pack extremely difficult. This is because the exposed adhesive surface presents a resistive force against the battery pack during insertion.

Therefore, it is desired to provide an adhesive pad for preventing device movement which allows easy insertion of the device into a chamber-like housing.

SUMMARY OF THE INVENTION

Briefly, according to the invention, a pad includes an adhesive member which has an adhesive surface disposed on at least one side. A shrinkable member is attached to the adhesive member, covering the adhesive surface. The shrinkable member is capable of reducing size to expose at least a portion of the adhesive surface in response to heat or other external factors.

DETAILED DESCRIPTION OF THE PREFERRED EMBODIMENT

Figure 1:
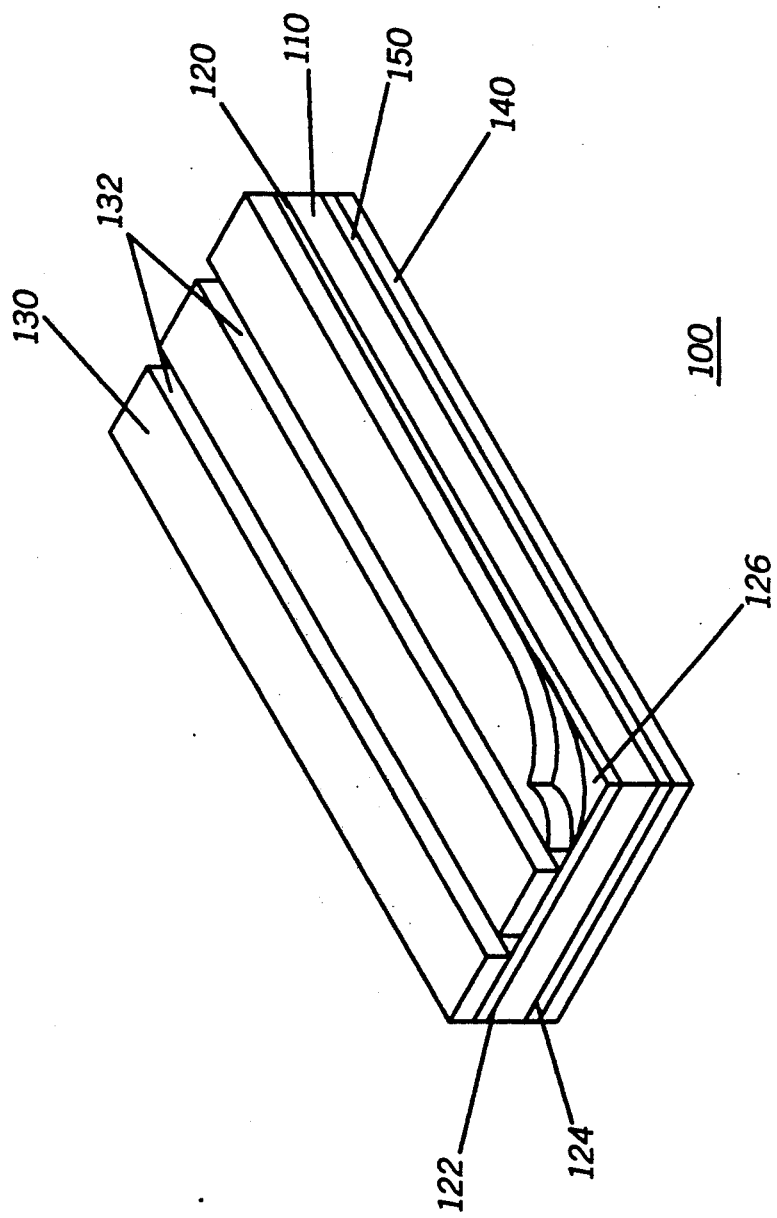
FIG. 1 is an isometric view of a pad according to the present invention.

Referring to FIG. 1, a pad 100, according to the present invention, includes a film 110, an adhesive layer 120, a shrinkable layer 130, and a peelable layer 140. In the preferred embodiment of the invention, the film 110 comprises an elastomeric film made of any suitable material, such as polyurethane, which has an elastic or resilient response to an exerted force. The film 110 has a first surface 122 and a second surface 124 on its opposing sides. The adhesive layer 120 which may comprise any suitable adhesive material, such as acrylic, is disposed on the first surface 122. Therefore, the film 110 and the adhesive layer 120 form an adhesive member which includes an adhesive surface 126. A shrinkable member 130 which is capable of reducing size in response to an external factor, such as heat, is disposed on the adhesive layer 120 and at least partially covers the adhesive surface 120. In the preferred embodiment, the shrinkable member 130 comprises a peelable layer of a well-known heat shrink material which includes pre-disposed openings 132 for pre-exposing some portions of the adhesive surface 126. As will later be described herein, the openings 132, although not required, significantly imporve the adherence capability of the pad 100. Preferably, the openings 132 comprise longitudinal grooves, however, the openings 132 may be of any other shape, such as circular holes.

According of the invention, the shrinkable member 130 is responsive to heat for reducing its size in order to expose at least a portion of the adhesive surface 126.

Figure 2A:
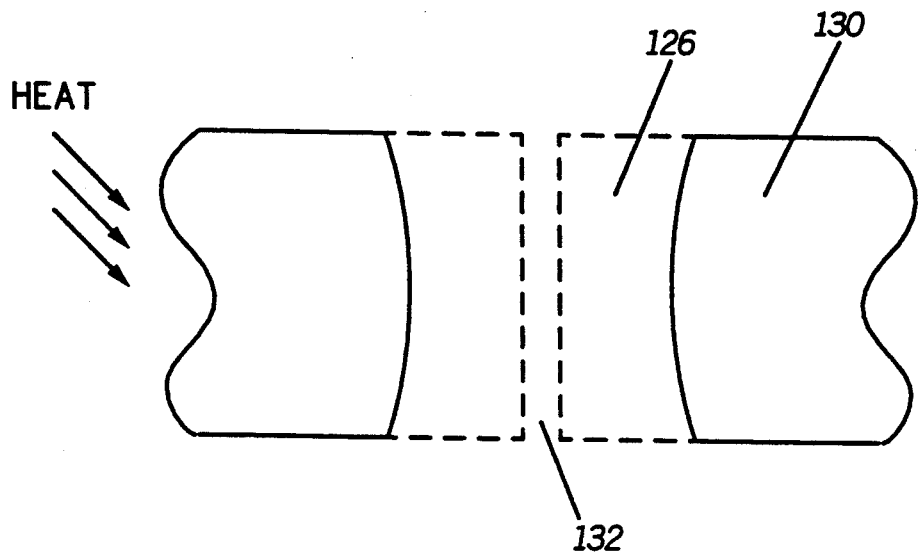
FIG. 2A is a fragmentary top view of one embodi,ent of the pad of FIG. 1.

Referring to FIG. 2A, a top fragmental view of the pad 100 is shown. The opening 132 is enlarged after application of heat to expose a larger portion of the adhesive surface 126. In FIG. 2A, the dotted line signifies the shape of the shrinkable member 130 before application of the heat and solid line signifies the shape of the shrinkable member 130 afterward. After sufficient adhesive surface is exposed, the pad 100 may adhesively attach to an external device.

Figure 2B:
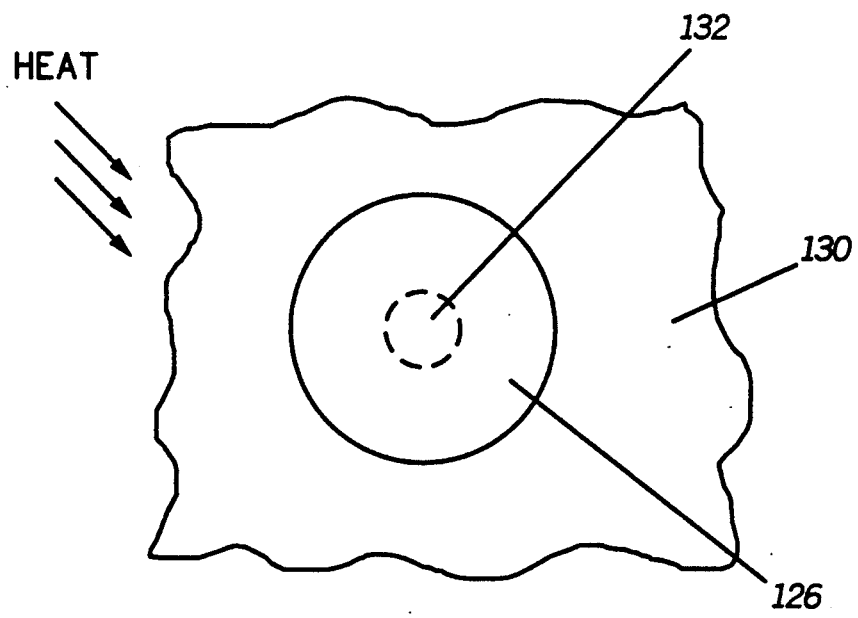
FIG. 2B is a fragmentary top view of another embodiment of the pad of FIG. 1.

Referring to FIG. 2B, the opening 132 comprises a circular hole exposing the adhesive surface 126. The pre-disposition of the openings 132 on the shrinkable member 130 facilitates adherence characteristic of the pad 100 by allowing the shrinkable member to freely reduce size at the predisposed positions, thereby providing a substantially uniform attachment to the pad and/or the external device. It may be appreciated that the shrinkable member 130 may be responsive to a number of suitable external factors, such as an externally disposed chemical compounds, or light, to reduce size for exposing the adhesive surface 126.

Referring back to FIG. 1, the pad 100 further includes an adhesive layer 150 disposed on the second surface 124 of the film 110. The adhesive layer 150 is covered by the peelable layer 140 which may be peeled to expose an adhesive surface which allows the pad 100 to attach to an external surface as a double-sided adhesive pad. The pad 100, therefore, may be attached between the external surface and the device to prevent device movements caused by external forces.

Figure 3:
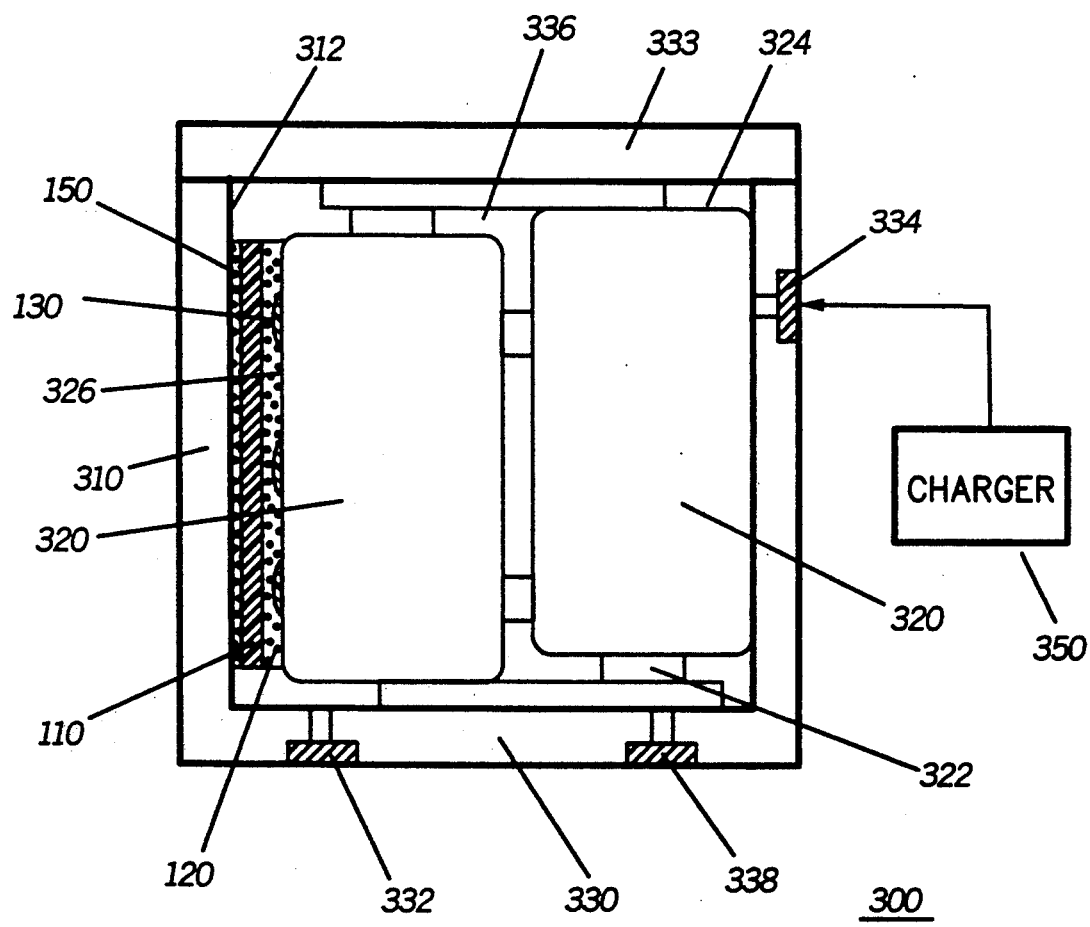
FIG. 3 is a cross-sectional view of a battery housing assembly according to the present invention.

Referring to FIG. 3, shown is a cross-sectional view of an energy source assembly 300 which uses the pad 100 of the present invention to prevent the movements of battery cells 320 within a battery housing member 330. The energy source assembly 300 comprises a battery package which may be used to provide supply voltage for a variety of electronic devices, such as a portable two-way radios. Each battery cell 320 has an outer surface 326 which includes a positive cell terminal 322 and a negative cell terminal 324 disposed at its opposing ends. A number of battery cells 320 are coupled in series to provide the desired supply voltage. The battery cells 320 are alternately flipped to facilitate series coupling of the cell terminals 322 and 324. The battery cells are bonded to each other by well-known spot welding processes to form a battery which is positioned within the battery housing member 330. The battery cells 320 comprise well-known nickel-cadmium cells which may be charged as frequently as needed by supplying a charging current.

In the preferred embodiment, the battery housing member 330 includes surrounding walls 310 which form a rectangular pocket 336. The wall 310 includes an inner surface 312. The surrounding walls may also be arranged to form a circular shaped pocket or any other suitable shape. At one side, the battery housing member 330 includes positive and negative battery terminals 332 and 338 which are electrically connected to appropriate cell terminals 322 and 324 in a well-known manner. The battery terminals 322 and 328 couple to appropriate supply terminals of the external electronic device (not shown) to source the supply voltage. At another side, charging terminals 334 are disposed which coupled to a charger 350 for receiving the charging current. The energy source assembly 300, is assembled by attaching pad 100 to the inner surface 312 of the wall 310. The peelable layer 140 (shown in FIG. 1) is peeled to expose the adhesive surface of the adhesive layer 150. It may be appreciated that more than one pad 100 may be attached to a number of the surrounding walls 310 to ensure that there is no movement in the battery pack within the energy source assembly 300. The battery pack may then be inserted into the pocket 336 such that the shrinkable layer 130 is positioned against the outer surface 326. In this arrangement, the shrinkable layer 130 prevents the adhesive surface 126 to present a resistive force or sliding friction when the battery pack is inserted. The dimensions of the pad 100, the housing member 330, and the battery cells 320 are selected to provide a sufficiently snug and tight fit which ensures the shrinkable member 130 to be flush against the outer surface 326. Finally, the assembly is sealed by enclosing bottom side 333. Upon application of heat, the adhesive surface 126 exposed due to size reduction of the shrinkable member 130 and attaches to the outer surface 326 due to resiliency of the elastomeric film 110. It is well known that charging battery cells generate a significant amount of heat. In the preferred embodiment of the invention, the shrinkable member 130 is subjected to the heat generated from charging the battery cells 320 to expose the adhesive surface 126.

Therefore, the pad 100 of the present invention provides a doublesided adhesive pad which may be used to bond a device to any enclosure, including enclosures having a chamber-like arrangement. The pad could attach to the housing wall and still allow the device to be inserted into the pocket without presenting an adhesive surface which impedes insertion. Additionally, in the energy source assembly, the application of the heat provided during the charging process significantly reduces labor intensity and improves the quality of the assembly. Although the pad 100 provides one effective means for neutralizing sheer forces, it can be easily peeled to detach from the assembly 300. Therefore, the assembly 300 of the present invention makes the battery pack salvagable in case of a defect.

What is claimed is:

1. A pad, comprising:
   an adhesive member including an adhesive surface; and
   a shrinkable member attached to the adhesive member for reducing size to expose at least a portion of the adhesive surface, wherein the shrinkable member comprises a shrinkable layer including predisposed openings for exposing portions of the adhesive surface.

2. The pad of claim 1, wherein the shrinkable member is responsive to heat for reducing size.

3. A pad, comprising:
   an adhesive member including an adhesive surface; and
   a shrinkable member attached to the adhesive member for reducing size to expose at least a portion of the adhesive surface, wherein the shrinkable member is responsive to a chemical compound for reducing size.

4. The pad of claim 1, wherein the adhesive member includes a film having a first and a second opposing surface, and an adhesive layer disposed on at least a portion of the first surface.

5. The pad of claim 4, wherein the film comprises an elastomeric film.

6. The pad of claim 4, wherein a peelable layer is disposed on the second surface of the film.

7. The pad of claim 1, wherein the shrinkable layer comprises a layer of heat shrink material.

8. The pad of claim 1, wherein the shrinkable layer comprises a peelable layer.

9. An assembly, comprising:
a portable electronic device;
a pad, including:
an adhesive member having an adhesive surface; and a shrinkable member attached to the adhesive member for reducing size to expose at least a portion of the adhesive surface wherein the portion being exposed bonds the pad to the device, wherein the shrinkable member comprises a shrinkable layer including predisposed openings for exposing portions of the adhesive surface.

10. The assembly of claim 9, further including a housing member for the device, wherein the pad is adhesively attached between the housing member and the device.

11. The assembly of claim 10, wherein the housing member has a surrounding wall forming a pocket for positioning the device therewithin.

12. The assembly of claim 9, wherein the shrinkable member is responsive to heat for reducing size.

13. The assembly of the claim 9, wherein the shrinkable member is responsive to a chemical compound for reducing size.

14. The assembly of claim 9, wherein the adhesive member includes a film having a first and a second opposing surface, and an adhesive layer disposed on at least a portion of the first surface.

15. The assembly of claim 14, wherein the shrinkable member comprises a shrinkable layer including predisposed openings for exposing portions of the adhesive layer.

16. The assembly of claim 14, wherein the film comprises an elastomeric film.

17. The assembly of claim 15, wherein the shrinkable layer comprises a layer of heat shrink material.

18. The assembly of claim 15, wherein the shrinkable layer comprises a peelable layer.

19. A battery housing assembly, comprising:
an energy source having an outer surface;
a housing member for housing the energy source having at least
one surrounding wall, the surrounding wall having an inner surface;
a pad being adhesively attached between the energy source and the housing member, comprising:
an adhesive member including an adhesive surface; and
a shrinkable member attached to the adhesive member for reducing size to expose at least a portion of the adhesive surface wherein the portion being exposed bonds the pad to the device.

20. The assembly of claim 19, wherein the housing member includes a pocket for housing the energy source.

21. The assembly of claim 19, wherein the shrinkable member is responsive to heat for reducing size.

22. The assembly of claim 21, wherein the shrinkable member is responsive to heat generated from charging the energy source for reducing size.

23. The assembly of the claim 19, wherein the shrinkable member is responsive to a chemical compound for reducing size.

24. The assembly of claim 19, wherein the adhesive member includes a film having a first and a second opposing surface, and an adhesive layer disposed on at least a portion of the first surface.

25. The assembly of claim 24, wherein the shrinkable member comprises a shrinkable layer including pre-disposed openings for exposing portions of the adhesive layer.

26. The assembly of claim 24, wherein the film comprises an elastomeric film.

27. The assembly of claim 25, wherein the shrinkable layer comprises a layer of heat shrink material.

28. The assembly of claim 25, wherein the shrinkable layer comprises a peelable layer.

* * * * *